April 14, 1959     T. R. HOOPES     2,882,079
RADIAL AND LONGITUDINAL STRESS-ABSORBING SUSPENSION PIVOT
Filed April 12, 1957
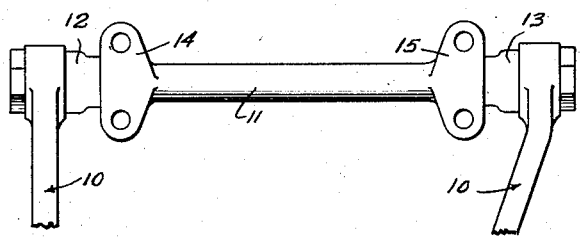
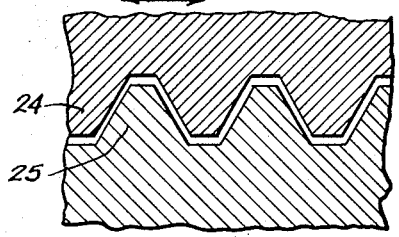 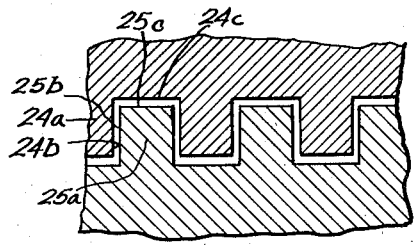
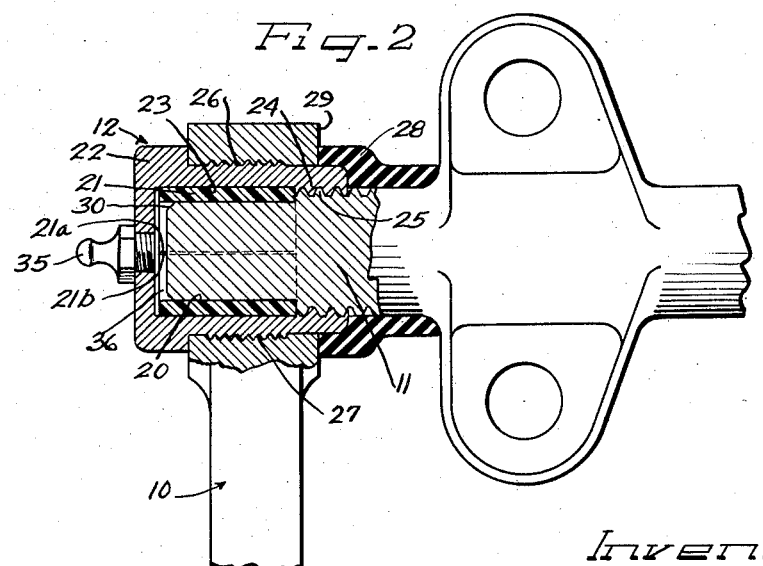
Inventor
THEODORE R. HOOPES

# United States Patent Office 2,882,079
Patented Apr. 14, 1959

2,882,079

RADIAL AND LONGITUDINAL STRESS-ABSORBING SUSPENSION PIVOT

Theodore R. Hoopes, Royal Oak, Mich., assignor to Thompson Products, Inc., Cleveland, Ohio, a corporation of Ohio Application April 12, 1957, Serial No. 652,504

6 Claims. (Cl. 287—85)

The present invention relates to pivot joints and is, more particularly, concerned with a substantially improved low friction pivot for the suspension control arms of automotive vehicles, or the like.

It has been the practice, in the automotive field, to employ wheel suspension systems having the individual front wheels independently mounted relative to the frame. In most conventional automobiles the support for each front wheel comprises a pair of upper and lower control arms pivoted about generally horizontal pivot axes extending substantially parallel to the longitudinal axis of the vehicle. The control arms are provided with universal pivotal connections at their outer ends for cooperation with a front wheel support spindle. A spring is provided between one of the control arms and the fixed vehicle frame in such a manner as to resist upward movement of the outer ends of the control arms, thereby supporting the weight of the vehicle.

In view of the substantially horizontal nature of the pivot axes of the control arms, it will be apparent that the main loads carried by the pivots will be applied transversely of the pivot axis. However, upon the application of transient impacts to the individual front vehicle wheels, rather substantial forces are applied longitudinally of the pivot axes for short periods of time. It is, accordingly, essential that a pivot joint for the control arm of a vehicle be constructed to accept rather substantial supporting loads transversely of the pivot axis with a minimum of friction and also accept transient loads applied generally longitudinally of the pivot axis.

In accordance with the principle of the present invention, an improved pivot joint is provided in which an anti-friction plastic material is arranged to accept substantially the entire load applied transversely to the axis of the pivot. This plastic bearing material is not, however, obliged to accept any of the load applied longitudinally of the pivot axis. Instead, this latter load is taken by non-anti-friction surfaces on a very simple pivot bearing housing.

In accordance with the present invention, the pivot axis of the individually suspended vehicle control arm is provided with a cylindrical bearing surface at its end and a threaded portion immediately thereadjacent. A cylindrical steel bushing is provided with a bore having an internal diameter very slightly greater than the outside diameter of the annular bearing surface of the pivot plus a cylindrical plastic bearing element. The bearing element is inserted within the cylindrical bushing and the bushing is then threaded into an aperture in the control arm and onto the threaded pivot member. The result of the assembly comprises a pivot stud member having a plastic annular liner member therearound and arranged for bearing contact with the inside diameter of the threaded bushing which in turn is simultaneously secured to the control arm and also longitudinally secured relative to the pivot member by means of a threaded connection. Appropriate seals are provided at the threaded joint between the bushing and the pivot member to prevent the ingress of dirt into the pivot joint and means are provided for inserting lubricant into the joint to lubricate the metal-to-plastic anti-friction surfaces.

As a result of the pivot construction above set forth, all loads applied to the pivot member through the control arm in a direction generally transverse to the pivot axis are absorbed in the plastic bearing liner and all loads applied generally longitudinally of the axis of the pivot member are taken by the threads of the bushing and pivot member.

It is accordingly, an object of the present invention to provide an improved pivot assembly for vehicle control arms, or the like, wherein a metal-to-plastic anti-friction pivotal connection is provided for accepting bearing loads transversely of the pivot axis and wherein a heavy duty threaded connection is provided for accepting loads applied longitudinally of the bearing axis.

Another object of the present invention is to provide a simplified yet highly efficient anti-friction pivot support assembly for automotive suspension arms, or the like.

Still a further object of the present invention is to provide a simple bearing structure for providing anti-friction rotation between a pair of relatively rotatable members.

Yet a further object of the present invention is to provide an improved, completely sealed, anti-friction pivot between a pair of relatively oscillatable members.

A feature of the present invention resides in the provision of separate bearing areas for accepting transversely applied loads and longitudinally applied loads between a pair of members mounted pivotally relative to one another on a single axis of rotation.

Yet another feature of the present invention is the utilization of an annular cylindrical sleeve of plastic in a bearing connection between relatively rotatable members in a manner preventing the application of longitudinally applied loads to the plastic.

Still a further object of the present invention is to provide an improved and simplified pivot joint construction in which an effective grease seal is provided and in which greasing of the bearing surfaces is simplified.

Yet a further object of the invention is to provide a simple anti-friction pivot capable of accepting heavy transverse pivot loads and capable of complete rebuilding upon excess wear, in an extremely simple manner.

Still other and further objects and features of the present invention will at once become apparent to those skilled in the art from a consideration of the attached drawing wherein two embodiments of the invention are shown by way of illustration only and wherein:

Figure 1 is a plan view of a control arm and pivot assembly;

Figure 2 is an enlarged partially broken away view of the left-hand pivot as viewed in Figure 1;

Figure 3 is an enlarged illustration of the threaded connection employed in the pivot shown in Figure 2; and Figure 4 is a modified form of the threaded connection shown in Figure 3.

As shown on the drawings:

As may be seen from a consideration of Figure 1, the pivot of the present invention is particularly suitable for use in automotive vehicle suspensions employing a suspension control arm generally indicated at 10 pivotally mounted relative to a support pivot member 11 by means of pivot joints 12 and 13. The pivot member 11 comprises a rigid bar having cylindrical bearing surfaces at its opposite ends within the joints 12 and 13 and securing flanges 14, 15 intermediate its ends for rigid attachment to a supporting structure such as for example the rigid vehicle frame. The control arm 10 is of the generally conventional construction and it is intended to support a wheel spindle at its end opposite from the joints 12, 13 in a manner generally well known in the art. (See for example United States patent to Booth No. 2,521,335; control arm 16, etc.)

The joints 12, 13 are preferably identical in construction and comprise, as illustrated in Figure 2, a cylindrical bearing surface 20 machined on the extreme end of the pivot member 11 for bearing relation with a plastic bushing 21. The bushing 21 is preferably constructed of a self-lubricating plastic of the low friction type, such as for example, the high molecular weight polyamides or polyethylene. The bearing bushing 21 is seated within bearing housing 22 and is in bearing relation therewith at the cylindrical bearing surface 23. The housing 22 is provided with threads 24 co-operating with threads 25 on the pivot member 11 and is, further, provided with threads 26 for co-operation with threads 27 on control arm 10. A rubber or inert plastic seal 28 is tightly confined on the pivot member 11, as shown in Figure 2 and cooperates with the face 29 on arm 10 to prevent ingress of dirt or other foreign materials into the housing 22.

For assembly purposes the ends of the pivot member 11 are beveled or chamfered as at 30 to permit alignment and insertion of the housing 22 without damage to the bushing 21. The bushing 21 is constructed of a strip of plastic to permit its collapse and insertion into the position shown in Figure 2 within the housing 22, past the upstanding threads 24. After positioning within the housing 22 it is expanded with the ends in substantial abutment as indicated at 21a and 21b.

As will be noted from a consideration of Figures 2 and 3, the bearing surface 20 on the pivot member 11 forms a snug fit with the bushing 21 which in turn is snugly fitted in the housing 22 as above described. Accordingly, the transmission of any loads transverse to the longitudinal axis of the pivot member 11, or in other words, radial loads relative to the pivot member, will be taken by the bushing 21. The bushing 21 however does not have provision for accepting and carrying any loads applied to the joint 12 longitudinally of the axis of the pivot member 11. All such loads are taken by the threads 24 and 25. As shown in Figure 3, the threads 24 and 25 are provided with a rather substantial clearance, particularly in the radial direction. This clearance permits seating of the surfaces 20 and 23 relative to the bushing 21 under all circumstances of radial load without at the same time affecting in any way the transmission of longitudinal loads, in the direction of arrow 31 shown in Figure 3. As a result of this arrangement a very satisfactory anti-friction bearing is provided for the radial loads imposed upon the pivot system without in any way lessening the ability of the pivot joint as a whole to prevent longitudinal separation of the joint parts and to accept longitudinally applied loads.

The thread form of the threads 24 and 25 is similar to that of the well-known Acme frustro-conical configuration. However, it will be apparent that since the threads 24 and 25 are designed to take only longitudinal loads and radial tolerance may desirably be very great relative to longitudinal tolerance, a square thread shape may be employed, such as shown in Figure 4. As there shown, the threads 24a, 25a, are provided with a square cross-section. With such an arrangement the tolerance between the lateral faces 24b, 25b may be substantially less than the tolerance between the longitudinal faces 24c, 25c. This permits extremely accurate control of the longitudinal play between the joint housing 22 and the pivot member 11 without in any way hampering bearing operations of the bushing 21. Other thread configurations may, of course, be similarly employed without departing from the scope of the present invention.

In order to satisfactorily seal the joint of the present invention and to provide sufficient lubrication for satisfactory operation, a grease fitting 35 is threaded into the end of the housing 22. As shown, the housing 22 is preferably positioned, in its final assembly, to provide a chamber 36. This chamber is filled with grease through the fitting 35 and provides lubricant to the bearing surfaces throughout the joint.

It will thus be seen that I have provided a novel and substantially improved suspension pivot wherein anti-friction means are provided for carrying transverse or radial loads applied to the joint while the somewhat lesser loads in the longitudinal direction of the joint bearing surfaces are accommodated by a threaded connection. As a result, the ordinary relatively high friction loads present when threaded connections are employed in radial loading, are avoided and a highly efficient, simple, pivot joint results. It will be apparent to those skilled in the art that the joint of the present invention, as illustrated in the embodiments of the drawing, may be employed in various uses other than the vehicular use illustrated, and that variations and modifications in the construction may be made without departing from the scope of the novel concepts of the present invention. For example, the bushing 21 may be constructed of plastic seamless tubing for reducing the diameter of the bearing surface 20, or increasing the diameter of the threads 24, 25 to permit insertion of the bushing 21 past the threads 24 without collapse of the bushing. It is, accordingly, my intention that the scope of the invention be limited solely by that of the hereinafter appended claims.

I claim as my invention:

1. A pivot joint providing low friction bearing support for radial loads transferred from an arm member to a pivot member comprising, a substantially cylindrical stud on said pivot member, a joint housing having a longitudinal bore therein, an annular plastic bearing liner positioned on said stud, said liner being positioned within said bore and providing a low friction bearing between said housing and said stud, co-operating threads on said stud and said housing for maintaining said housing in positive axially fixed position on said stud and in bearing relation with said liner and means securing said housing to said arm member.

2. A pivot joint providing low friction bearing support for radial loads transferred from an arm member to a pivot member comprising, a substantially cylindrical stud on said pivot member, a joint housing having a longitudinal bore therein, an annular plastic bearing liner positioned on said stud, said liner being positioned within said bore and providing a low friction bearing between said housing and said stud, co-operating threads on said stud and said housing for maintaining said housing in positive axially fixed position on said stud and in bearing relation with said liner, means securing said housing to said arm member, said co-operating threads on said housing projecting radially into said bore and said liner being longitudinally slit completely through to permit its collapse and insertion within said bore past said thread.

3. A pivot joint providing low friction bearing support for radial loads transferred from an arm member to a pivot member comprising, a substantially cylindrical stud on said pivot member, a joint housing having a longitudinal bore therein, an annular plastic bearing liner positioned on said stud, said liner being positioned within said bore and providing a low friction bearing between said housing and said stud, co-operating threads on said stud and said housing for maintaining said housing in positive axially fixed position on said stud and in bearing relation with said liner, and means securing said housing to said arm member, the radial tolerance of said co-operating threads being substantially greater than the radial tolerance between said liner, housing and stud.

4. A pivot joint providing low friction bearing support for radial loads transferred from an arm member to a pivot member comprising, a substantially cylindrical stud on said pivot member, a joint housing having a longitudinal bore therein, an annular plastic bearing liner positioned on said stud, said liner being positioned within said bore and providing a low friction bearing between said housing and said stud, co-operating threads on said stud and said housing for maintaining said housing in positive axially fixed position on said stud and in bearing relation with said liner and means securing said housing to said arm member, said last named means comprising a threaded connection between said housing and said arm member.

5. A pivot joint providing low friction bearing support for radial loads transferred from an arm member to a pivot member comprising, a substantially cylindrical stud on said pivot member, a joint housing having a longitudinal bore therein, an annular plastic bearing liner positioned on said stud, said liner being positioned within said bore and providing a low friction bearing between said housing and said stud, co-operating threads on said stud and said housing for maintaining said housing in position on said stud and in bearing relation with said liner, means securing said housing to said arm member, and resilient annular seal means snugly contacting the external surface of said stud at a point adjacent said co-operating threads thereon and extending into surface contact with said arm to thereby seal the co-operating thread connection between said stud and said housing against the ingress of foreign material.

6. A pivot joint providing low friction bearing support for radial loads transferred from an arm member to a pivot member comprising, a substantially cylindrical stud on said pivot member, a joint housing having a longitudinal bore therein, an annular plastic bearing liner positioned on said stud, said liner providing a radially snug bearing between said housing and said stud, co-operating radially loose threads on said stud in said housing for maintaining said housing in predetermined axial position on said stud and positively preventing relative movement therebetween in either axial direction and in bearing relation with said liner, and means separably securing the housing to said arm member.

References Cited in the file of this patent

UNITED STATES PATENTS

| | | |
|---|---|---|
| 1,437,646 | Girard | Dec. 5, 1922 |
| 1,528,895 | Schmidt | Mar. 10, 1925 |
| 1,762,057 | Gates et al. | June 3, 1930 |
| 1,861,053 | Dykstra | May 31, 1932 |
| 1,867,045 | Young et al. | July 12, 1932 |
| 2,431,120 | Howe | Nov. 18, 1947 |